No. 725,375. PATENTED APR. 14, 1903.
A. STAMBACH.
FASTENING DEVICE.
APPLICATION FILED SEPT. 16, 1902.
NO MODEL.

WITNESSES:
J. R. Keller
C. H. Klieman

INVENTOR.
Arthur Stambach
by W. G. Doolittle
Attorney.

UNITED STATES PATENT OFFICE.

ARTHUR STAMBACH, OF WILKINSBURG, PENNSYLVANIA.

FASTENING DEVICE.

SPECIFICATION forming part of Letters Patent No. 725,375, dated April 14, 1903.

Application filed September 16, 1902. Serial No. 123,586. (No model.)

*To all whom it may concern:*

Be it known that I, ARTHUR STAMBACH, a citizen of the United States, residing at Wilkinsburg, in the county of Allegheny and State of Pennsylvania, have invented certain new and useful Improvements in Fastening Devices, of which the following is a specification, reference being had therein to the accompanying drawings.

My invention relates to a new and improved fastening device, and more particularly to that class of fastening devices formed from a single piece of metal and especially adapted for joining the adjacent edges of two or more pieces of wood.

The object of the present invention is to improve such devices and to produce a fastener of greater binding or clamping power, of greater strength and efficiency than those heretofore made, and of such form as to be more quickly and efficiently handled before finally driving it into the wood.

To these ends my invention consists, generally stated, of a fastener having a central portion and projecting end portions, said end portions each being reversely bent outwardly from opposite faces of the central portion, forming points projecting beyond the driving edge, and in the construction, all as fully hereinafter described and claimed.

Figure 1:
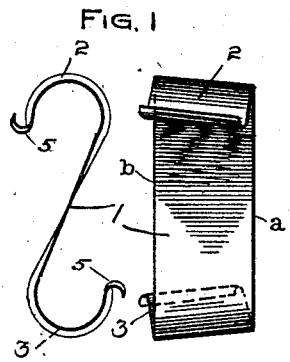
Figure 2:
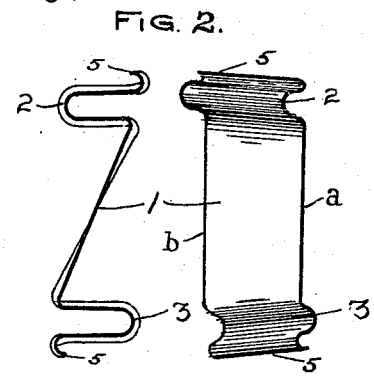
Figure 3:
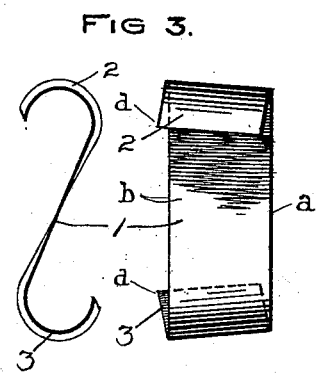
Figure 4:
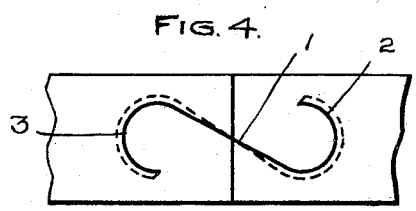
Figure 5:
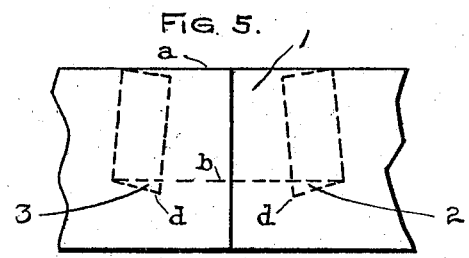
Figure 6:
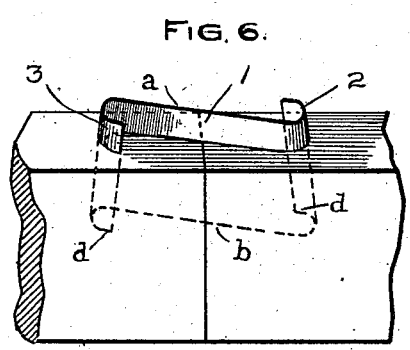
Figure 7:
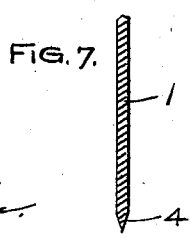

In the accompanying drawings, which illustrate applications of my invention, Figures 1, 2, and 3 show elevational and plan views of various forms of fastening devices constructed in accordance with my invention. Fig. 4 is a plan view of one form of fastener driven into two pieces of wood; Fig. 5, a side view of the form of Fig. 4, showing the position of the device within the pieces; Fig. 6, a perspective view showing the fastening device partly within the pieces, and Fig. 7 a cross-sectional view particularly showing the sharpened entering edge of the device.

Referring to the drawings, the fastening devices shown comprise three essential portions—namely, the central portion 1, having parallel side edges $a$ and $b$, and the end portions 2 and 3. The end portions are reversely bent outwardly from opposite faces of the central portion and are preferably inclined thereto and converge toward each other from the lower or entering edge to the top, thereby forming a wedge-shaped space between said end portions.

It will be noted that the points $d$ of the end portions or flanges lie in planes different from the planes of the side edges of the central portion, projecting beyond the same on the driving edge $b$ and within the same on the following edge $a$, all as shown in the various figures giving elevational views of my device. Such a form is of very great advantage in the art, as it enables the fastener to be placed in correct position by trial by pressing into the wood said projecting points of the end portions either by hand or by a slight tap of the hammer before the final blow is struck to drive the fastener home. As these fasteners are in many instances extremely small, the advantage of being able to first by trial place the device in its correct position for driving and then to be able to remove the fingers before the final blow is struck is apparent.

Another important feature of the form of fastener herein shown and claimed is in using such a form of blank that when the end portions are bent as described their end edges will be parallel to the slanting ends of the central wedge-shaped portion. The advantage in this is that the fastener is driven home with greater ease and is also enabled to retain its shape, and therefore its holding power, after being driven home, because of its not having the surplusage of metal on the upper or following corners of the reversely-bent end portions which would otherwise be there if the fastener were formed from a rectangular blank, as heretofore.

The importance of the wedge form will be readily appreciated by those skilled in the art, for by the employment of the same the fastener not only tightly clamps and draws the pieces together, but is prevented from being drawn out of the wood. The entering edge 4 is sharpened along its entire length, as particularly shown by Fig. 7.

The end portions of the fasteners are preferably provided with short curved gripping extensions 5. (Particularly shown by Figs. 1 and 2.) These short curved extensions 5 are of considerable strength and greatly add to the binding or holding power of the fasteners. By the employment of these extensions I am enabled to produce from very thin sheet metal a fastener of great strength, a fastener whose binding power is equal to that of a fastener formed from metal of much greater thickness and not provided with these extensions.

What I claim is—

1. As an improved article of manufacture, a fastening device consisting of a central, wedge-shaped portion having parallel side edges, and end portions or flanges reversely bent outwardly from opposite sides of said central portion whereby the points of said flanges lie in planes different from the planes of the side edges of said central portion, substantially as described.

2. As an improved article of manufacture, a fastening device consisting of a central, wedge-shaped portion having parallel side edges, and end portions or flanges reversely bent outwardly from opposite sides of said central portion having end edges parallel to the ends of said central wedge-shaped portion, the points of which lie in planes different from the planes of the side edges of said central wedge-shaped portion, substantially as described.

3. As an improved article of manufacture, a fastening device consisting of a central, wedge-shaped portion having parallel side edges, end portions or flanges reversely bent outwardly from opposite sides of said central portion whereby the points of said flanges or end portions lie in planes different from the planes of the side edges of the central portion, and a gripping extension on each of the end portions or flanges, substantially as described.

4. As an improved article of manufacture, a fastening device of an S-shaped form consisting of a central wedge-shaped portion having parallel side edges, and end portions or flanges reversely bent outwardly from opposite sides and back upon the central portion, whereby the points of said flanges lie in planes different from the planes of the side edges of said central portion, substantially as described.

5. As an improved article of manufacture, a fastening device of an S-shaped form consisting of a central wedge-shaped portion having parallel side edges, end portions or flanges reversely bent outwardly and back upon the central portion, whereby the points of the flanges or end portions lie in planes different from the planes of the side edges of the central portion, and a gripping extension on each of the end portions or flanges, substantially as described.

In testimony whereof I affix my signature in presence of two witnesses.

ARTHUR STAMBACH.

Witnesses:
W. G. DOOLITTLE,
C. A. WILLIAMS.